Nov. 24, 1925.
W. M. GRIFFIN
1,562,636
MEASURING SCALE FOR TRANSPARENT LIQUID CONTAINERS
Filed July 28, 1924
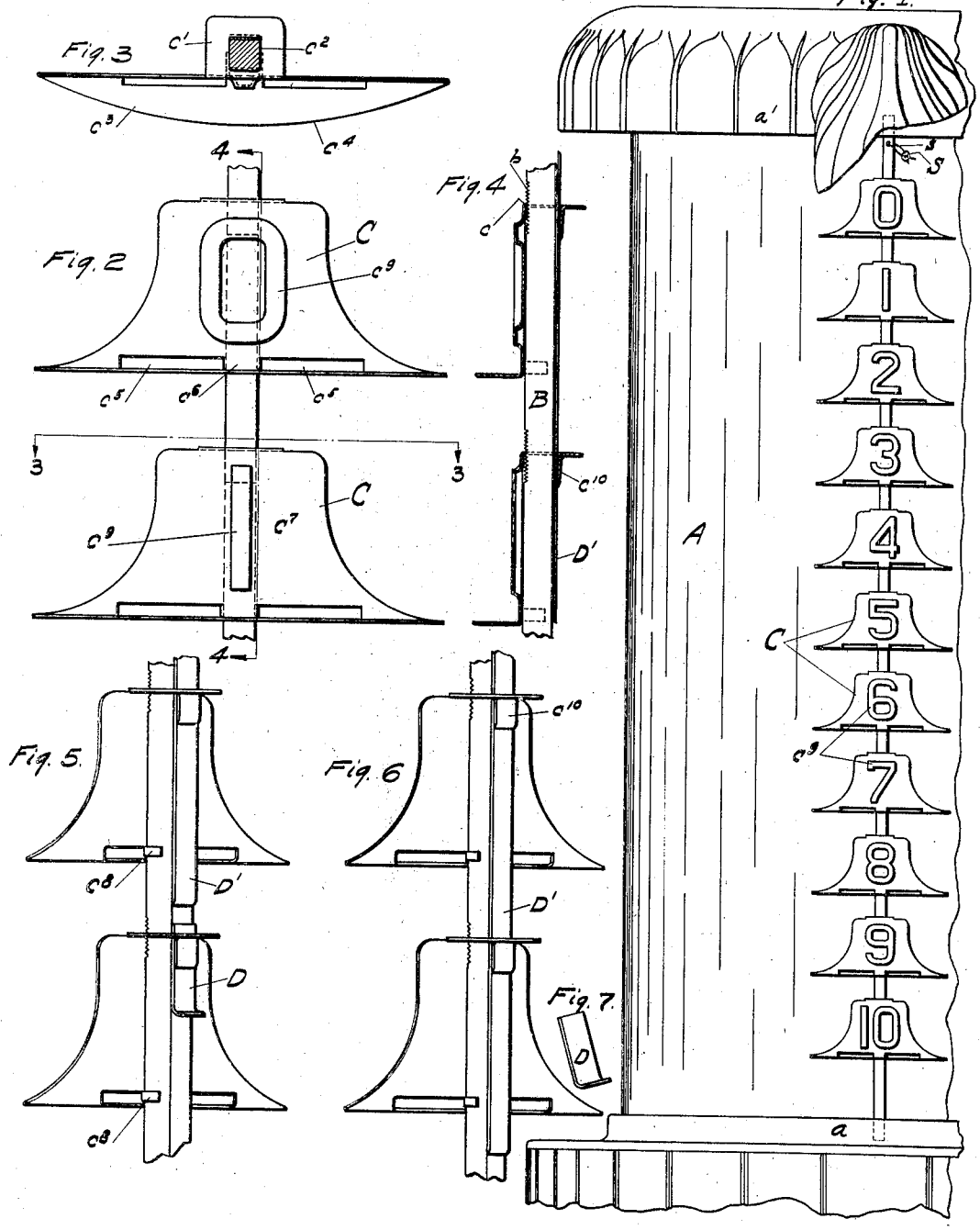
INVENTOR
William M. Griffin
BY
Walter A. Knight
ATTORNEY Patented Nov. 24, 1925.

1,562,636

UNITED STATES PATENT OFFICE.

WILLIAM M. GRIFFIN, OF FORT WAYNE, INDIANA, ASSIGNOR TO WAYNE TANK & PUMP COMPANY, OF FORT WAYNE, INDIANA, A CORPORATION OF INDIANA.

MEASURING SCALE FOR TRANSPARENT LIQUID CONTAINERS.

Application filed July 28, 1924. Serial No. 728,656.

*To all whom it may concern:*

Be it known that I, WILLIAM M. GRIFFIN, a citizen of the United States, residing at Fort Wayne, in the county of Allen and State of Indiana, have invented new and useful Improvements in Measuring Scales for Transparent Liquid Containers, of which the following is a specification.

My invention relates to measuring scales for transparent liquid containers. The device is adapted to be secured to the casing on the inside of a transparent liquid container, from which the liquid is to be dispensed and measured as delivered so that the customer can plainly see for himself what quantity he has received. Such devices are used principally on so-called visible dispensing apparatus for handling gasoline on which an elevated glass container is used.

The principal object of this invention is to provide such a measuring scale with a vertically adjustable tab for each of the indicating numbers, and means for securely holding said tabs in their adjusted positions and maintaining them in said positions by a single wire and seal.

Another object of my invention is to provide a simple, inexpensive device readily secured in using position, which may be readily set and re-set for use, and which may be easily read from the street level, the scale lines with which the liquid levels are compared being adapted to seat against the inside of the wall of the transparent liquid container.

With these and other objects in mind my invention is illustrated and described in the drawings and specifications respectively.

In the particular embodiment of my invention selected for illustration and shown in the accompanying drawings:—

Figure 1 is a front elevation of part of a visible dispensing apparatus showing part of the visible container, with my invention secured therein ready for use.

Fig. 2, a detail, is a front elevation of the two top tabs and the setting bar with parts above and below broken away.

Fig. 3 is a plan view of a tab and a section through the setting bar, on the line 3—3 of Fig. 2.

Fig. 4 is a vertical section on the line 4—4 of Fig. 2.

Fig. 5 is a perspective from the back of Fig. 2 during the time temporary settings are being changed to fixed ones.

Fig. 6 is the same, the fixed setting having been completed, and

Fig. 7 is the temporary setting wedge that is shown in use in Fig. 5 and just displaced in Fig. 6.

Referring now to the drawings, A is the transparent liquid container with support $a$ and cap $a^1$ together forming a casing to which the setting bar B is secured so as to hold the scale device in an upright position within said container.

The front side of the bar B is provided with fine horizontal serrations $b$, against which the edge $c$ of the tab C seats when the tab is placed in position on the bar.

At its top the tab has a flange $c^1$ turned backwardly at right angles and is provided with a suitable hole $c^2$ through which the bar B passes.

At its bottom the tab has a flange $c^3$ turned forwardly at right angles, its face $c^4$ forming an arc to conform to the shape of the inner surface of the wall of the cylindrical transparent container A. The edge $c^4$ of the flange $c^3$ forms the scale line, and at the back a slot $c^5$ $c^5$ on either side of the central connecting strip $c^6$ spaces the flange $c^3$ clear of the face $c^7$ of tab C.

These tabs are preferably punched from sheet metal and guide flanges $c^8$ are formed one on either side, to maintain the tab in erect, upright position. The part punched to form the hole $c^2$ is turned at right angles so as to form a flange $c^{10}$ extending downwardly parallel with the bar B when the tab is in position. Suitable numerals $c^9$ are formed or fixed to the face of the tabs. The hole $c^2$ is formed with just sufficient depth so that when either the temporary setting wedge D or the fixed setting strip $D^1$ is in position back of the bar B, the edge $c$ of the tab C is firmly seated against the serrations $b$ holding the tab securely from displacement. When setting the scale a wedge D is used for each tab, being inserted from below, and when the strip $D^1$ is inserted from above to hold all tabs in position the wedges D are pushed out, each in turn, without allowing the tabs C to be loosened so as to change position on the bar B. A seal S and wire s secure the bar B to the strip D¹.

Obviously many changes may be made in the device without departing from the spirit of my invention.

I claim as my invention and desire to secure by Letters Patent of the United States:—

1. A scale for transparent liquid containers, comprising a setting bar placed vertically within said container, a rough surface on the front side of said bar, an adjustable tab bearing a suitable numeral, a gripping surface on the tab adapted to co-act with the rough surface on the bar, and removable means for so holding said tab and bar in locked relation.

2. A scale for transparent liquid containers comprising a setting bar placed vertically within said container, a rough surface on the front side of said bar, an adjustable tab bearing a suitable numeral, a gripping surface on the tab adapted to co-act with the rough surface on the bar, and removable wedging means back of said bar to hold said tab and bar in locked relation.

3. A scale for transparent liquid containers, comprising a setting bar, substantially horizontal serrations on the front side of said bar, an adjustable tab pierced by said bar and bearing a suitable numeral, a gripping edge on the tab adapted to engage said serrations, and removable wedging means back of said bar to hold said tab and bar in locked relation.

4. A scale for transparent liquid containers, comprising a setting bar, substantially horizontal serrations on the front side of said bar, an adjustable tab pierced by said bar and bearing a suitable numeral, a gripping edge on the tab adapted to engage said serrations, removable wedging means back of said bar to hold said tab and bar in locked relation, and a flange on the front of said tab with an edge adapted to seat against the inside of the wall of said container.

5. A measuring scale for a transparent liquid container adapted to be secured to the casing thereof on the inside of said container, having in combination a vertically placed setting bar, substantially horizontal serrations on one side of said bar, a plurality of tabs loosely pierced by said bar, each having a gripping edge adapted to engage said serrations, a wedge for each tab to be inserted from below when said tab is in adjusted position in the bar perforation of said tab on the side of said bar opposite the serrations, and a wedge strip adapted to be inserted from above in the same perforations forcing out said wedges, and means for fixing said strip in such assembled position.

6. In combination with a setting bar for a measuring scale to be used on the inside of a transparent liquid container, a plurality of tabs each punched from a single piece of sheet metal, and having a scale numeral, a perforation for the bar, a flange adapted to contact with the back of said bar to keep said tab flat against said bar, flanges contacting with the sides of said bar to keep said tab in upright position, and a flange on the front of said tab with edge shaped to contact with the inside of the wall of said container.

In testimony whereof I have hereunto set my hand.

WILLIAM M. GRIFFIN.